US007010149B1

(12) United States Patent
Knoplioch et al.

(10) Patent No.: US 7,010,149 B1
(45) Date of Patent: Mar. 7, 2006

(54) METHOD AND SYSTEM OF FUSION OF TWO DIGITAL RADIOGRAPHIC IMAGES

(75) Inventors: Jerome Knoplioch, Neuilly sur Seine (FR); Eric Stefani, Boulogne-Billancourt (FR); Jean Labarre, Paris (FR)

(73) Assignee: GE Medical Systems SA, (FR)

( * ) Notice: Subject to any disclaimer, the term of this patent is extended or adjusted under 35 U.S.C. 154(b) by 0 days.

(21) Appl. No.: 09/720,541

(22) PCT Filed: Apr. 28, 2000

(86) PCT No.: PCT/IB00/00606

§ 371 (c)(1),
(2), (4) Date: Jun. 27, 2001

(87) PCT Pub. No.: WO00/67202

PCT Pub. Date: Nov. 9, 2000

(30) Foreign Application Priority Data

Apr. 29, 1999 (FR) .................................. 99 05438

(51) Int. Cl.
*G06K 9/00* (2006.01)
(52) U.S. Cl. ...................... 382/128; 382/284; 382/295; 382/296
(58) Field of Classification Search ................ 382/131, 382/132, 151, 201, 274, 282, 284, 294, 300, 382/130, 169, 228, 278, 289, 296, 128, 285, 382/295; 250/458.1; 128/922; 378/21, 378/62; 600/425
See application file for complete search history.

(56) References Cited

U.S. PATENT DOCUMENTS

| | | | |
|---|---|---|---|
| 5,490,516 A * | 2/1996 | Hutson ........................ 600/508 |
| 5,531,520 A | 7/1996 | Grimson et al. |
| 5,672,877 A | 9/1997 | Liebig et al. .......... 250/363.04 |
| 5,954,650 A * | 9/1999 | Saito et al. .................. 600/425 |
| 6,101,239 A * | 8/2000 | Kawasaki et al. ............ 378/63 |
| 6,266,453 B1 * | 7/2001 | Hibbard et al. ............. 382/294 |
| 6,268,870 B1 * | 7/2001 | Kato .......................... 345/660 |
| 6,429,878 B1 * | 8/2002 | Turek et al. ................ 345/636 |
| 6,661,865 B1 * | 12/2003 | Popilock ....................... 378/19 |
| 6,670,614 B1 * | 12/2003 | Plut et al. .............. 250/363.04 |
| 6,748,043 B1 * | 6/2004 | Dobbs ........................... 378/4 |

(Continued)

FOREIGN PATENT DOCUMENTS

WO    WO 9620421    7/1996

OTHER PUBLICATIONS

Sharma et al, "39.2 Multisensor Image Registration", SID International Symposium Digest of Technical Papers, US, vol. 28, pp 951-954, May 1997.

(Continued)

*Primary Examiner*—Barry Choobin
(74) *Attorney, Agent, or Firm*—Cantor Colburn LLP

(57) ABSTRACT

A method of fusion of a first digital radiographic image obtained as a result of scanning with a second digital radiographic image obtained by magnetic resonance imaging (MRI). A CT interval of gray levels is selected first in the scanner image. Each pixel of the scanner image having a gray level lying within the CT interval is then replaced by a pixel obtained by digital processing of the pixel of the same coordinates as the MRI image. The final image corresponds to the scanner image in which the pixels of gray levels lying within the CT interval have undergone the digital processing.

21 Claims, 3 Drawing Sheets

U.S. PATENT DOCUMENTS

2002/0101436 A1 * 8/2002 Shastri et al. ............... 345/619
2003/0023266 A1 * 1/2003 Borillo et al. ............... 606/200
2004/0011137 A1 * 1/2004 Hnat et al. ................... 73/789
2004/0047804 A1 * 3/2004 Wolf et al. ................. 424/1.11
2004/0064038 A1 * 4/2004 Bruder et al. ............... 600/425

OTHER PUBLICATIONS

Mitiche et al, "Multiple Sensor Integration/Fusion Throught Image Processing: A Review", Soc. of Photo-Optical Instrumentation Engineers, vol. 25, No. 3 pp 380-386 Mar. 1996.

* cited by examiner

METHOD AND SYSTEM OF FUSION OF TWO DIGITAL RADIOGRAPHIC IMAGES

This application claims the benefit of a priority under 35 USC 119 and 35 USC 365 and 371 to PCT/IB00/00606 and French Patent Application No. 99 05438 filed Apr. 29, 1999, the entire contents of which are hereby incorporated by reference.

BACKGROUND OF THE INVENTION

The invention concerns the fusion of two digital images of an object, the first image of which favors a particular constituent of the object, while the second image favors another.

It has a particularly important application in the medical field, in which a first image of a body organ obtained by scanning is fused with a second image of the same organ obtained by magnetic resonance imaging (MRI).

In fact, an image obtained by means of a scanner particularly reveals the bony part. In such an image, the bony part is white and all the other parts, especially, the soft tissues, are of a homogeneous gray without contrast. On the other hand, an image obtained by means of MRI reveals the soft tissues in different shades of gray levels and the other parts like the bony parts and empty space are black.

In general, in the medical field a scanner image is fused with an MRI image by integrating the pixels of the bony parts of the scanner image in the MRI image.

The scanner images possess an absolute scale of gray levels, that is, all the scanner images are compatible with one another, in the sense that a given gray level always represents a particular organ. This absolute scale is the Hounsfield scale, composed of positive and negative numbers, in which the 0 level is the gray level of water.

An MRI image does not possess an absolute scale. The gray levels depend on the patient and on the image acquisition conditions. Therefore, from one MRI image to another, the muscle, for example, as soft tissue, is not represented by the same gray level. Thus, fusion of an MRI image with a scanner image results in a final image whose scale is not absolute.

In other words, the fusion of an image possessing an absolute scale with another image not possessing an absolutely scale results in a final image not possessing any absolute scale.

Furthermore, an image not possessing any absolute scale cannot be used by any of the current scanner image processing software. In fact, all of that software uses a standard gray level format, which is the Hounsfield scale.

Thus, a final image originating from the fusion of both scanner and MRI images is incompatible with any scanner image processing software. It is necessary to develop specific image processing software not calibrated on the Hounsfield scale, in order to be able to use the final image.

BRIEF SUMMARY OF THE INVENTION

An embodiment of the invention provides a solution to that problem by a scaling of the gray levels of the MRI image, in order to render the final image compatible with all scanner image processing software. In other words, the final image will be calibrated on the Hounsfield scale.

It is an advantage of an embodiment of the invention to reduce the cost of investment in the development of specific software, if it is desired to carry out digital processing on the final image. An embodiment the invention uses a final image of as an image source for standard radiotherapy software, which is not the case with the fused images in the present state of the art.

An embodiment of the invention proposes a method of fusion of a first digital radiographic image obtained as a result of scanning with a second digital radiographic image obtained by magnetic resonance imaging (MRI).

In an embodiment of the invention, a CT interval of gray levels is selected in the scanner image and each pixel of the scanner image having a gray level lying within the CT interval is replaced by a pixel obtained by digital processing of the pixel of the same coordinates as the MRI image. The final image therefore corresponds to the scanner image in which the pixels of gray levels lying within the CT interval are thus modified.

Furthermore, with a view to effective digital processing, a two-dimensional recentering of both MRI and scanner images may be carried out by means of at least one rotation and/or translation operation, so that a pixel of the scanner image of coordinates (x,y) and a pixel of the MRI image of the same coordinates (x,y) represent the same portion of the organ X-rayed.

In other words, the range of gray levels corresponding to the soft tissues is replaced by a new range of gray levels. The values of the gray levels of that new range are obtained from an algorithm introducing certain gray levels of the MRI image. For a given pixel of the CT interval in the scanner image, the algorithm calculates the gray level value of the new pixel from a pixel of the MRI image having the same coordinates as the pixel of the CT interval having to be replaced.

In an embodiment of the invention, the upper limit $B_{CT}$ of the CT interval is fixed at a gray level value on the Hounsfield scale, the gray level corresponding to the highest value of the gray levels representing the soft tissues visualized on the scanner image. The lower limit $A_{CT}$ of the CT interval is fixed at a gray level value on the Hounsfield scale, the gray level corresponding to the lowest value of the gray levels representing soft tissues visualized on the scanner image.

More precisely, two thresholds are fixed, defining the CT interval corresponding to the soft tissues in the scanner image.

In practice, $B_{CT}$ is fixed as the highest value of the soft tissues in the scanner image and $A_{CT}$ is fixed as the lowest value of the soft tissues in the scanner image.

The interval thus selected is an interval included in the Hounsfield scale, since the scanner image is calibrated on that scale.

In general, in an embodiment of the invention, one selects an MR interval of gray levels in the MRI image, whose upper limit $B_{MR}$ corresponds to a gray level above which the pixels are white, and whose lower limit $A_{MR}$ corresponds to a gray level below which the pixels are black.

In other words, that interval takes into account all of the variation of gray levels in the MRI image. This variation, this contrast, represents the useful information on the soft tissues.

There are then two intervals, a first CT interval in the scanner image included in the Hounsfield scale and a second MR interval in the MRI image not linked to the Hounsfield scale. These two intervals represent a framing of the soft tissues.

In an embodiment of the invention, the digital processing consists of a linear interpolation by means of an affine function integrating the value of the lower limit $A_{CT}$ and upper limit $B_{CT}$ of the CT interval in the scanner image and the value of the lower limit $A_{MR}$ and upper limit $B_{MR}$ of the MR interval in the MRI image.

Carrying out a linear interpolation makes it possible to respect the choice of contrast in the MRI image.

Preferably, for a scanner pixel having a gray level $V_{CT}$ lying within the CT interval, the gray level $V_{MR}$ of the pixel of the same coordinates in the MRI image is determined, and then a gray level in the CT interval is determined from the affine function and from the level $V_{MR}$. The gray level $V_{OUT}$ of each pixel of the final image can then be obtained by the following algorithm:

if $V_{CT} < A_{CT}$, then
1) $V_{OUT} = V_{CT}$,
if $V_{CT} > B_{CT}$, then
2) $V_{OUT} = V_{CT}$
if $A_{CT} < V_{CT} < B_{CT}$, then
3) $V_{OUT} = A_{CT} + (B_{CT} - A_{CT})(V_{MR} - A_{MR})/(B_{MR} - A_{MR})$.

In other words, while maintaining the resolution of the MRI image, the MRI image is scaled so that the black level $A_{MR}$ of the MRI image corresponds to the lowest value $A_{CT}$ of the soft tissues in the scanner image. Likewise, the white level $B_{MR}$ of the MRI image corresponds to the highest value $B_{MR}$ of the soft tissues in the scanner image.

In fact:
for $V_{MR} = B_{MR}$, highest gray level in the MR interval of the MRI image,
one obtains by 3) $V_{OUT} = B_{CT}$, highest gray level in the CT interval of the scanner image,
and for $V_{MR} = A^{MR}$, lowest gray level in the MR interval of the MRI image,
one obtains by 3) $V_{OUT} = A_{CT}$, lowest gray level in the CT interval of the scanner image.

Scaling causes the MR interval not calibrated on the Hounsfield scale of the MRI image to undergo a digital processing which makes it correspond to the CT interval lying within the Hounsfield interval.

Thus, all the gray level values $V_{OUT}$ of the final image will be contained in the Hounsfield scale, which is the standard scale of scanner image processing.

The invention is also directed to a system of fusion of a first digital radiographic image obtained by scanning with a second digital radiographic image obtained by MRI, comprising:
means for reading pixels of the scanner image, the gray levels of which lie within a predetermined CT interval;
means for reading pixels of the MRI image, the coordinates of which are identical to those of the pixels of the CT interval of the scanner image; and
means for calculation of a third image composed of the scanner image in which the pixels whose gray levels lie within the CT interval are replaced by pixels obtained by digital processing of the pixels of the same coordinates as the MRI image in order to obtain an image making possible visualization of the soft tissues and bony tissues.

The final image obtained is of the scanner type. It can therefore be processed by standard software such as Advantage Sim or even Advantage Windows 3D Viewer, which is not the case with the fusion images of the prior art. The methods of the prior art require the use of specific software in order to be able to process their fusion images.

Other advantages and characteristics of the invention will appear on examination of the detailed specification of a nonlimitative embodiment and of the attached drawings, in which:

DETAILED DESCRIPTION OF THE INVENTION

Figure 1:
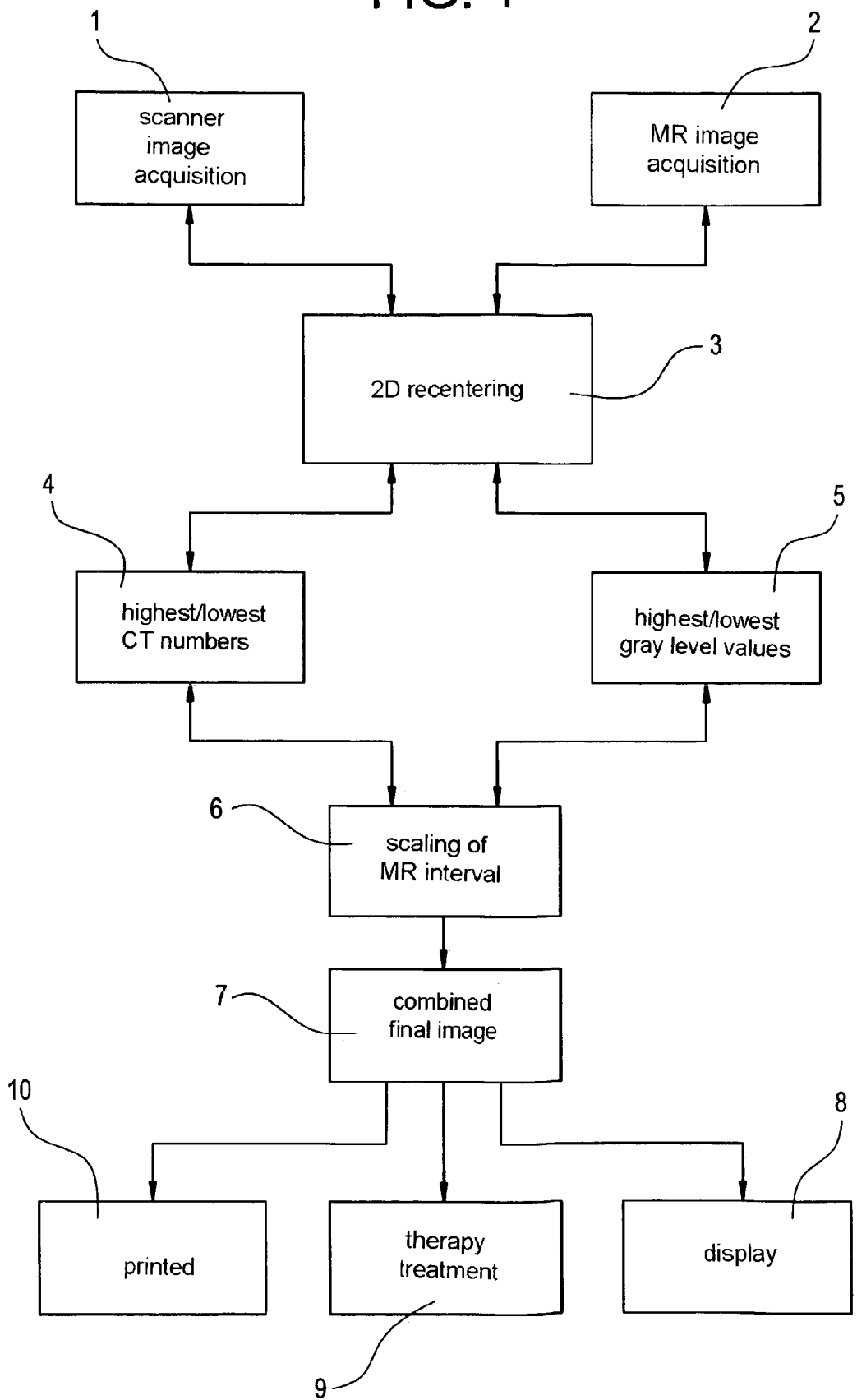
FIG. 1 is a flow chart of an embodiment of the method according to the invention.
Figure 3:
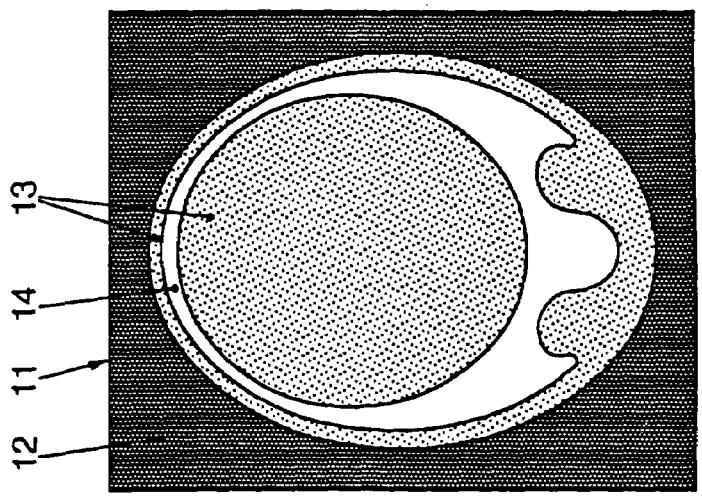
FIG. 3 is a radiographic image acquisition by a scanner.
Figure 4:
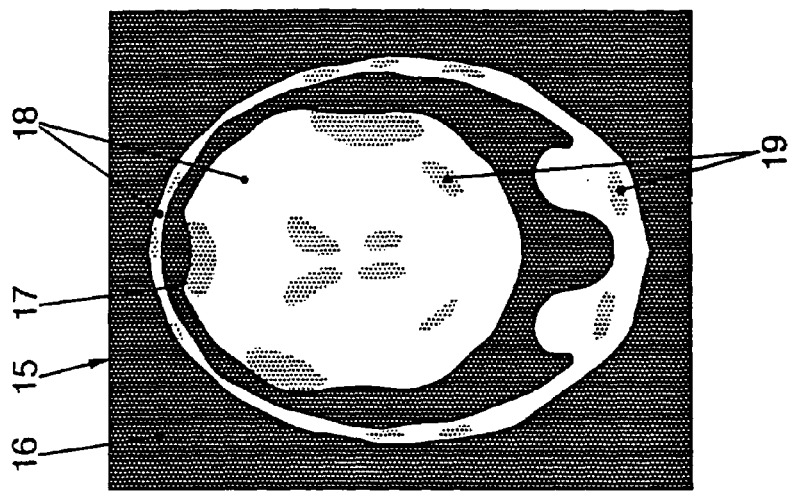
FIG. 4 is a radiographic image acquisition by magnetic resonance imaging.

Referring in particular to the three FIGS. 1, 3 and 4, first of all, the two digital images are acquired. Acquisition 1 makes it possible to obtain a scanner image 11 illustrated in FIG. 3. This image represents a view of a patient's head along a given plane. A part outside the head can be distinguished there, that is, the air 12 represented in black. The white zone 14 corresponds to the bony tissues and all the grayish zones 13 correspond to the soft tissues. The scanner image 11 is of particular interest because it favors visualization of the bony tissue. Its principal characteristic is therefore a perfect display of the bony tissues 14. On the other hand, the grayish zones 13 have a poor resolution, so that it is impossible to distinguish the contrasts in the soft tissues.

Acquisition 2 makes it possible to obtain an image 15 by magnetic resonance imaging. It represents a view of a patient's head along the same plane as the scanner image 11. A black part 16 can also be distinguished there, corresponding to the air all around the head. Inside the head, the black zones 17 correspond to the bony tissues and to any element other than the soft tissues, like air, for example. The grayish zones 18 represent the soft tissues. The principal characteristic of that image is the display of soft tissues. The resolution is sufficient to distinguish contrasts, elements of interest 19. On the other hand, it is difficult to delimit the bony parts 17, for they are merged with the air and every other element appearing in black on the image 15.

These two images 11 and 15 originating from two different methods of acquisition 1 and 2 represent a view of the head along a given cutting plane. Thus, a two-dimensional recentering 3 is made in order to render the two images 11 and 15 superposable. For this purpose, rotation and/or translation operations are possibly carried out. There are tools known to the expert that make it possible to control the recentering operation 3. One can mention, notably, the tool using a pointer, that is, a particular element is pointed to on the scanner image 11, for example, and a cursor appears on the same particular element on the MRI image 15. The same idea is exploited in the tool using a magnifier.

Once the two images 11 and 15 are recentered, one determines in stage 4 the lowest value $A_{CT}$ of the soft tissues in the scanner image, for example, −130, which is a low value of soft tissues in the Hounsfield scale. One also determines the highest value $B_{CT}$ of soft tissues in the scanner image, for example, 80, which is a high value of soft tissues in the Hounsfield scale. These two values are both CT numbers. A CT number is defined from the attenuation coefficient of the tissue considered and from the attenuation coefficient of water:

$$CT\ Number = \frac{\mu_0 - \mu_w}{\mu_w} \times 1000$$

with $\mu w$: attenuation coefficient of water $\mu 0$: attenuation coefficient of the tissue considered.

The CT number is expressed in Hounsfield unit.

Table of CT Numbers

| ELEMENTS OF THE HUMAN BODY | CT NUMBER |
|---|---|
| BONE (CORTEX) | >250 |
| BONE (MARROW) | 130 ± 100 |
| COAGULATED BLOOD | 80 ± 10 |
| THYROID GLAND | 70 ± 10 |
| LIVER | 50 ± 10 |
| MUSCLE | 45 ± 5 |
| BLOOD | 40 ± 10 |
| BRAIN (WHITE MATTER) | 35 ± 5 |
| KIDNEY | 30 ± 10 |
| BRAIN (GRAY MATTER) | 25 ± 5 |
| FATTY TISSUE | −100 ± 10 |

Two values $A_{MR}$ and $B_{MR}$ on the MRI image are also determined in stage 5. $A_{MR}$ is a gray level such that the lower gray levels are considered black. $B_{MR}$ is a gray level such that the higher gray levels are considered white.

Figure 2:
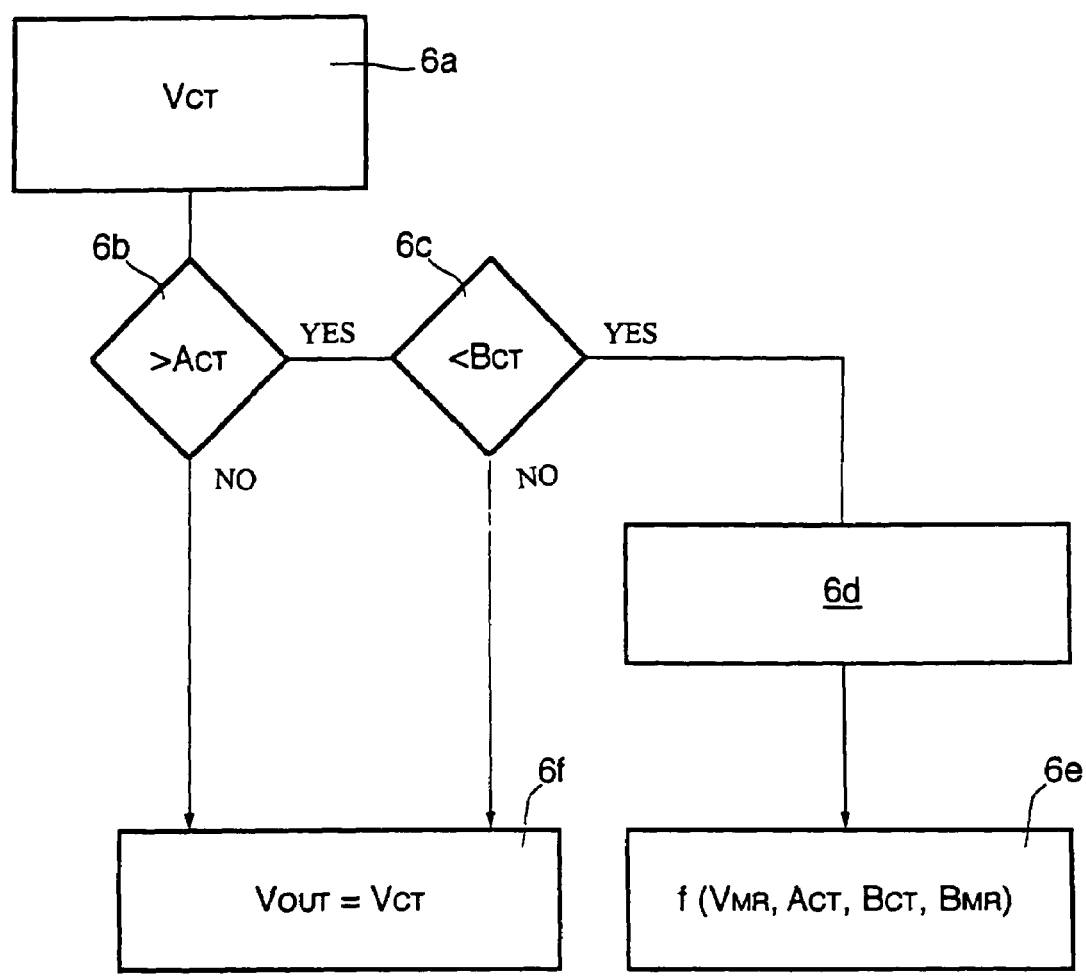
FIG. 2 schematically illustrates two images obtained by a tomography system.

One then proceeds with an algorithm 6 making possible scaling of the MR interval. According to a preferred embodiment of the invention, algorithm 6 is applied in accordance with FIG. 2. A target pixel of the scanner image of gray level equal to $V_{CT}$ is taken in the course of stage 6a. In the first place, it is going to be determined whether that value is included in the CT interval. For that purpose, both values of the lower limit $A_{CT}$ and upper limit $B_{CT}$ are introduced. First of all, the value $V_{CT}$ is compared to value $A_{CT}$ in the course of stage 6b. If the gray level of the target pixel $V_{CT}$ is less than $A_{CT}$, then the target pixel is outside the CT interval and it can then correspond to the bony tissue 14 or to the black background 12 of the scanner image. In that case, the target pixel maintains its value $V_{CT}$ on the final image 20.

Otherwise, if the gray level $V_{CT}$ is higher than $A_{CT}$, it is compared in the course of stage 6c to value $B_{CT}$. If the gray level $V_{CT}$ is higher than the upper limit $B_{CT}$ of the CT interval, then the target pixel maintains its value $V_{CT}$ on the final image 20 in the course of stage 6f, that is, $V_{OUT}$, the gray level of the target pixel on the final image 20, is equal to $V_{CT}$. Thus, for a value $V_{CT}$ lower than $A_{CT}$ or higher than $B_{CT}$, the level $V_{CT}$ is maintained as gray level $V_{OUT}$ of the final image 20.

On the other hand, if $V_{CT}$ is higher than $A_{CT}$ and lower than $B_{CT}$, the gray level $V_{MR}$ of a pixel of the MRI image of the same coordinates as the target pixel of the scanner image is then determined in the course of stage 6d. It is then made to undergo a linear inter-polation at that gray level $V_{MR}$ by introducing levels $A_{CT}$, $B_{CT}$, $A_{MR}$ and $B_{MR}$. A new value $V_{OUT}$ independent of $V_{CT}$ is then obtained in the course of stage 6e.

Algorithm 6 is presented in that case in the form:

if $V_{CT}<-130$, then

1) $V_{OUT}=V_{CT}$, if $V_{CT}>80$, then

2) $V_{OUT}=V_{CT}$, if $-130<V_{CT}<80$, then

3) $V_{OUT}=-130+(80+130)\ (V_{MR}-A_{MR})/(B_{MR}-A_{MR})$.

Figure 5:
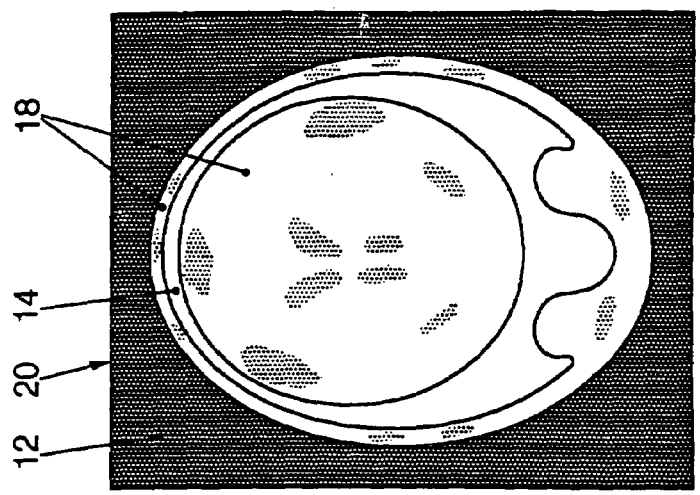
FIG. 5 is a final radiographic image based on the fusion of the images of FIGS. 3 and 4.

Whatever the values $A_{MR}$ and $B_{MR}$, the final image 20 presents a range of gray levels according to the Hounsfield scale. FIG. 5 shows the final image 20 in which the bony tissues 14 as well as the soft tissues 18 are distinguished. The background of the image 12 remains black, as on the scanner image 11.

However, for a scanner image obtained according to a view of the lungs, a pixel of gray level $V_{CT}$ representing the lungs in the scanner image will have value $V_{OUT}$ equal to $V_{CT}$ in the final image, whatever the gray level $V_{CT}$ included or not in the CT interval. In other words, if the gray levels of the lungs in the final image are the gray levels of the lungs in the scanner image, the linear interpolation is not applied on the gray levels of the lungs. This is due to the fact that the gray levels representing the lungs possess such dynamics that the scanner image has a better resolution than the MRI image.

The final image 20, whose gray levels are contained in the Hounsfield scale, was thus determined. This final image is then safeguarded in stage 7 in the form of a scanner image. It can be printed in stage 10 or even displayed in stage 8 on a screen for possible study. But the main advantage of that methods resides in the fact that this image can be delivered on entry of a standard radiotherapy treatment system in stage 9.

The final image originating from fusion of a scanner image with an MRI image reveals soft tissues as well as bony tissues and can be used a source for all standard scanner image processing software, such as Advantage Sim, Isis or even Advantage Windows Viewer.

Various modifications in structure and/or steps and/or function may be made by one skilled in the art without departing from the scope of the invention.

What is claimed is:

1. A method of fusion of first and second digital radiographic images of an object comprising:

scanning the object to provide first digital radiographic image;

providing the second digital radiographic by magnetic resonance imaging (MRI);

selecting in the scanner image a CT interval of a gray level wherein each pixel of the scanner image having the gray level lying within upper and lower limits of the CT interval is replaced by a pixel obtained by digital processing of the pixel of the same coordinates as the MRI image having corresponding MRI image gray levels; and providing a final image corresponding to the scanner image in which the pixels of gray levels lying within the CT interval are thus modified.

2. The method according to claim 1, wherein a dimensional recentering of both MRI and scanner images is carried out by means of at least one rotation and/or translation operation, so that a pixel of the scanner image of coordinates (x,y) and a pixel of the MRI image of the same coordinates (x,y) represent the same portion of the object.

3. The method according to claim 1 wherein an upper limit $B_{CT}$ of the CT interval is fixed at a gray level value on the Hounsfield scale, the gray level corresponding to the highest value of the gray levels representing the soft tissues visualized on the scanner image.

4. The method according to claim 2 wherein an upper limit $B_{CT}$ of the CT interval is fixed at a gray level value on the Hounsfield scale, the gray level corresponding to the highest value of the gray levels representing the soft tissues visualized on the scanner image.

5. The method according to claim 1 wherein a lower limit $A_{CT}$ of the CT interval is fixed at a gray level value on the Hounsfield scale, the gray level corresponding to the lowest value of the gray levels representing soft visualized on the scanner image.

6. The method according to claim 2 wherein a lower limit $A_{CT}$ of the CT interval is fixed at a gray level value on the Hounsfield scale, the gray level corresponding to the lowest value of the gray levels representing soft tissues visualized on the scanner image.

7. The method according to claim 3 wherein a lower limit $A_{CT}$ of the CT interval is fixed at a gray level value on the Hounsfield scale, the gray level corresponding to the lowest value of the gray levels representing soft tissues visualized on the scanner image.

8. The method according to claim 4 wherein a lower limit $A_{CT}$ of the CT interval is fixed at a gray level value on the Hounsfield scale, the gray level corresponding to the lowest value of the gray levels representing soft tissues vie on the scanner image.

9. The method according to claim 1 wherein another MR interval of gray levels in the MRI image is selected, whose upper limit $B_{MR}$ corresponds to a gray level above which the pixels are white.

10. The method according to claim 9 wherein a lower limit $A_{MR}$ of the MR interval corresponds to a gray level below which the pixels are black.

11. The method according to claim 1 wherein the digital processing comprises a linear interpolation.

12. The method according to claim 11 wherein the linear interpolation introduces an affine function integrating the value of a lower limit $A_{CT}$ and an upper limit $B_{CT}$ of the CT interval in the scanner image and the value of a lower limit $A_{MR}$ and an upper limit $B_{MR}$ of the MR interval in the MRI image.

13. The method according to claim 12 wherein a scanner pixel having a gray level $V_{CT}$ lying within the CT interval, a gray level $V_{MR}$ of the corresponding pixel in the MRI image is determined, a gray level in the CT interval is determined from the affine function and from the level $V_{MR}$; a gray level $V_{OUT}$ of each pixel of the final image is obtained by the following algorithm:
if $V_{CT} < A_{CT}$, then
1) $V_{OUT} = V_{CT}$,
if $V_{CT} > B_{CT}$, then
2) $V_{OUT} = V_{CT}$,
if $A_{CT} < V_{CT} < B_{CT}$, then
3) $V_{OUT} = A_{CT} + (B_{CT} - A_{CT})(V_{MR} - A_{MR})/(B_{MR} - A_{MR})$.

14. A system of fusion of first and second digital radiographic images comprising:
means for providing the first digital radiographic image by scanning;
means for providing the second digital radiographic image by MRI;
means for reading pixels of the scanner image, gray levels of which lie within upper and lower limits of a CT interval;
means for reading pixels of the MRI image, coordinates of which are identical to those of the pixels of the CT interval of the scanner image; and
means for calculation of a third image comprising the scanner image in which the pixels whose gray levels lie within the CT interval are replaced by pixels obtained by digital processing of the pixels of the same coordinates as the MRI image having corresponding MRI image gray levels in order to obtain an image making possible visualization of the soft tissues and bony tissues.

15. A method for combining first and second radiographic images of an object to provide a third image comprising:
providing the first image by CT scanning;
providing the second image by MR scanning;
recentering the first and second images by a two-dimensional rotation and/or translation so that the coordinates of the CT image and the MR image represent the same portion of the object;
fixing in the CT image gray scale levels corresponding to upper and lower limits of the CT interval;
fixing in the MR image gray levels corresponding to upper and lower limits of the MR interval;
combining the first and second images to provide the third image by linear interpolation by integration the respective lower and upper limits of the CT interval and the respective lower and upper limits of the MR image, the third image having gray levels which lie within the CT interval are replaced by pixels of the same coordinates in the MR image.

16. A computer program product comprising a computer a readable medium having computer readable program code means embodied in the medium, the computer readable program code means implementing the method claim 1.

17. A computer program product comprising a computer a readable medium having computer readable program code means embodied in the medium, the computer readable program code means implementing the method claim 15.

18. An article of manufacture for use with a computer system, the article of manufacture comprising a computer readable medium having computer readable program code means embodied in the medium, the program code means implementing the method of claim 1.

19. An article of manufacture for use with a computer system, the article of manufacture comprising a computer readable medium having computer readable program code means embodied in the medium, the program code mean implementing the method of claim 15.

20. A program storage device readable by a machine tangibly embodying a program or instructions executable by the machine to perform the method of claim 1.

21. A program storage device readable by a machine tangibly embodying a program or instructions executable by the machine to perform the method of claim 15.

* * * * *

UNITED STATES PATENT AND TRADEMARK OFFICE
CERTIFICATE OF CORRECTION

PATENT NO. : 7,010,149 B1  Page 1 of 1
APPLICATION NO. : 09/720541
DATED : March 7, 2006
INVENTOR(S) : Knoplioch et al.

It is certified that error appears in the above-identified patent and that said Letters Patent is hereby corrected as shown below:

Column 6:
Line 52, after "a" insert "two-"

Column 7:
line 4, after "soft" insert "tissues"
line 19, after "tissues" delete "vie" and insert therefore -- visualized --

Column 8:
line 32, before "readable" delete "a"
line 36, before "readable delete "a"
line 47, after "code" delete "mean" and insert therefor -- means --

Signed and Sealed this

Eighth Day of August, 2006

JON W. DUDAS
*Director of the United States Patent and Trademark Office*